US011300937B2

(12) United States Patent
Yoon et al.

(10) Patent No.: US 11,300,937 B2
(45) Date of Patent: Apr. 12, 2022

(54) ELECTRONIC APPARATUS AND CONTROLLING METHOD THEREOF

(71) Applicant: SAMSUNG ELECTRONICS CO., LTD., Suwon-si (KR)

(72) Inventors: Sukun Yoon, Suwon-si (KR); Younghoon Moon, Suwon-si (KR); Youngseok Ko, Suwon-si (KR); Jin Seol, Seoul (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 180 days.

(21) Appl. No.: 16/722,926

(22) Filed: Dec. 20, 2019

(65) Prior Publication Data

US 2020/0201277 A1 Jun. 25, 2020

(30) Foreign Application Priority Data

Dec. 20, 2018 (KR) .................. 10-2018-0166749

(51) Int. Cl.
 *G05B 19/042* (2006.01)
 *G06F 1/26* (2006.01)
 (Continued)

(52) U.S. Cl.
 CPC .......... *G05B 19/042* (2013.01); *G06F 1/266* (2013.01); *G06F 9/4403* (2013.01); *G08C 17/02* (2013.01); *G05B 2219/23077* (2013.01)

(58) Field of Classification Search
 CPC ........ G05B 19/042; G05B 2219/23077; G06F 1/266; G06F 9/4403; G08C 17/02
 See application file for complete search history.

(56) References Cited

U.S. PATENT DOCUMENTS 10,063,804 B2 8/2018 Yang et al.
10,096,237 B2 10/2018 Lee et al.
(Continued)

FOREIGN PATENT DOCUMENTS

EP 2 892 039 A1 7/2015
EP 3 273 419 A1 1/2018
(Continued)

OTHER PUBLICATIONS

Communication dated Mar. 11, 2020 issued by the European Patent Office in counterpart European Application No. 19216344.2.
(Continued)

*Primary Examiner* — Gary Collins
(74) *Attorney, Agent, or Firm* — Sughrue Mion, PLLC

(57) ABSTRACT

An electronic apparatus includes a communication module configured to wirelessly communicate with an external remote controller; a main memory; and a main processor, wherein the main processor is further configured to transmit a control signal for registering a key value corresponding to a first key from among keys included in the external remote controller as a selected function from among a plurality of functions capable of being performed by the electronic apparatus to the communication module, based on product information of the electronic apparatus stored in the main memory, and wherein the communication module is further configured to register the key value corresponding to the first key to the selected function based on the control signal, and control the main processor to perform the selected function based on a signal corresponding to the key value corresponding to the first key being received from the external remote controller.

20 Claims, 13 Drawing Sheets

(51) Int. Cl.
 *G06F 9/4401* (2018.01)
 *G08C 17/02* (2006.01)

(56) References Cited

U.S. PATENT DOCUMENTS

| | | | |
|---|---|---|---|
| 2013/0179698 A1* | 7/2013 | Woods | H04N 21/4222 713/300 |
| 2013/0241714 A1 | 9/2013 | Nakano et al. | |
| 2014/0211099 A1* | 7/2014 | Saha | H04L 12/2818 348/734 |
| 2014/0215380 A1* | 7/2014 | Kang | H04N 21/42212 715/781 |
| 2014/0267933 A1* | 9/2014 | Young | H04N 5/4403 348/734 |
| 2015/0301836 A1* | 10/2015 | Chung | H04N 21/482 713/2 |
| 2016/0065726 A1 | 3/2016 | Kuznetsov et al. | |
| 2017/0180918 A1 | 6/2017 | Yang et al. | |
| 2018/0091845 A1 | 3/2018 | Lee et al. | |
| 2018/0158316 A1 | 6/2018 | Ham et al. | |

FOREIGN PATENT DOCUMENTS

| | | |
|---|---|---|
| JP | 2004-187143 A | 7/2004 |
| JP | 2006-324707 A | 11/2006 |
| KR | 10-2006-0037081 A | 5/2006 |
| KR | 10-2013-0052471 A | 5/2013 |
| KR | 10-1594874 B1 | 2/2016 |
| KR | 10-2016-0023742 A | 3/2016 |
| KR | 10-2016-0126448 A | 11/2016 |
| KR | 10-2017-0033172 A | 3/2017 |
| KR | 10-2017-0073257 A | 6/2017 |
| KR | 10-1816723 B1 | 1/2018 |

OTHER PUBLICATIONS

Written Opinion dated Apr. 14, 2020 issued by the International Searching Authority in counterpart International Application No. PCT/KR2019/018050 (PCT/ISA/237).

International Search Report dated Apr. 14, 2020 issued by the International Searching Authority in counterpart International Application No. PCT/KR2019/018050 (PCT/ISA/210).

* cited by examiner

FIG. 3A

| function | key value |
|---|---|
| Ambient Button | 0×00F6 |
| CH up | 0×0012 |
| CH down | 0×0010 |
| Turn on | 0×0002 |
| Reserved | 0×00AD |

FIG. 5A

| item | HAL API | VSC define (hcidefs.h) |
|---|---|---|
| Add background turn on key value | int (*add_turnon_key_value)(uint8_t *value); | HCI_VSC_ADD_TURNON_KEY_VALUE |
| Remove background turn on key value | int (*remove_turnon_key_value)(uint8_t *value); | HCI_VSC_REMOVE_TURNON_KEY_VALUE |
| Get list of background turn on keys | int (*get_list_of_turnon_key_value)(void); | HCI_VSC_GET_LIST_OF_TURNON_KEY_VALUE |

FIG. 5B

| item | HAL API | VSC define (hcidefs.h) |
|---|---|---|
| enable/disable LPM Key | int (*enable_lpm_key_setup)(uint8_t enable); | HCI_VSC_LPM_KEY_SETUP |

ELECTRONIC APPARATUS AND CONTROLLING METHOD THEREOF

CROSS-REFERENCE TO RELATED APPLICATION(S)

This application claims priority from Korean patent application number 10-2018-0166749, filed on Dec. 20, 2018, in the Korean Intellectual Property Office, the disclosure of which is incorporated by reference herein in its entirety.

BACKGROUND

1. Field

The disclosure relates to an electronic apparatus and controlling method thereof. More particularly, the disclosure relates to an electronic apparatus capable of changing in software so that different operations can be performed on the same signal received from a remote controller and a controlling method thereof.

2. Description of Related Art

An electronic apparatus controlled by a remote controller is previously set to be turned on by a key value corresponding to a power key of the remote controller, and the key value is stored in a communication module of the electronic apparatus that communicates with the remote controller. Therefore, the electronic apparatus can be turned on only by the same key value received from the remote controller.

However, as product specifications have diversified, there has been a demand to turn on electronic apparatuses using keys other than the power key of the remote controller. For example, the remote controller may include a home key in addition to the power key, and a product specification may specify that the electronic apparatus can be turned on even when the home key is selected.

In order to do so, two methods may be utilized. The first method is to newly produce a remote controller, which means that a key value emitted when a home key is pressed is the same as a key value when a power key is pressed. The second method is to newly produce a communication module which will be included in an electronic apparatus, that is a method to newly produce a communication module for turning on when receiving a key value emitted when the home key of the remote controller is pressed.

However, these two methods may result in higher costs in development and production, which is a crucial problem for producers, and may cause confusion because various remote controllers and various communication modules must be managed separately.

SUMMARY

Provided are an electronic apparatus capable of changing in software so that different operations can be performed on the same signal received from a remote controller and a controlling method thereof.

In accordance with an aspect of the disclosure, there is provided electronic apparatus including: a communication module configured to wirelessly communicate with an external remote controller; a main memory configured to store at least one instruction; and a main processor configured to execute the at least one instruction, wherein the main processor is further configured to transmit a first control signal for registering a key value corresponding to a first key from among keys included in the external remote controller as a selected function from among a plurality of functions capable of being performed by the electronic apparatus to the communication module, based on product information of the electronic apparatus stored in the main memory, and wherein the communication module is further configured to register the key value corresponding to the first key to the selected function based on the first control signal, and control the main processor to perform the selected function based on a signal corresponding to the key value corresponding to the first key being received from the external remote controller.

The selected function may be a turn-on function for turning on the electronic apparatus, and the communication module may be further configured to, in a state in which the main processor is powered off and the communication module is powered on, based on the signal corresponding to the key value corresponding to the first key being received from the external remote controller, control the main processor to be powered on.

The main processor is further configured to, based on the product information, the first control signal for registering the key value corresponding to the first key to the turn-on function and a first application execution function to the communication module.

The electronic apparatus may further include a display, the communication module may be further configured to, based on the signal corresponding to the key value corresponding to the first key being received from the external remote controller while the main processor is powered off, transmit a second control signal for controlling the main processor to be powered on and execute a first application corresponding to the first application execution function to the main processor, and the main processor may be further configured to, based on the second control being received from the communication module while the main processor is powered off, be switched from a power off state to a power on state and execute the first application to display the first application execution screen.

The main processor may be further configured to, based on the electronic apparatus being powered on for a first time or a software stored in the main memory of the electronic apparatus being updated, transmit the first control signal to the communication module.

The main processor may be further configured to, based on the main processor being powered on, confirm a flag stored in the main memory, based on a first value being recorded in the flag, perform an operation for transmitting the first control signal for registering the key value corresponding to the first key from among the keys included in the external remote controller as the selected function, and based on a second value being recorded in the flag, not perform the operation.

The main processor may be further configured to transmit the first control signal for registering the key value corresponding to the first key as the selected function to the communication module and register the second value to the flag.

The main processor may be further configured to, based on the product information of the electronic apparatus, download information on the key value of the external remote controller corresponding to the selected function from an external server.

The electronic apparatus may further include a display, the main processor may be further configured to control the display to display a user interface (UI) to set a key of the external remote controller to be mapped to the turn-on function, and based on the second key from among the keys included in the external remote controller being set to be mapped to the turn-on function through the UI, transmit the first control signal for registering the key value corresponding to the second key as the turn-on function to the communication module.

The communication module includes a communication processor and a communication memory, the main processor may be further configured to, based on the product information of the electronic apparatus, transmit the first control signal for registering the key value corresponding to the first key from among the keys included in the external remote controller as the selected function from among the plurality of functions capable of being performed by the electronic apparatus to the communication module, the communication memory may be configured to store a table which defines a relation between the key value corresponding to the signal received from the external remote controller and the function of the electronic apparatus, and the communication processor may be configured to, based on the first control signal received from the main processor, modify the table stored in the communication memory.

The communication module may be configured to communicate with the external remote controller using Bluetooth communication.

In accordance with an aspect of the disclosure, there is provided a method of controlling an electronic apparatus including a communication module configured to wirelessly communicate with an external remote controller, a main memory configured to store at least one instruction, and a main processor configured to execute the at least one instruction, the method including: transmitting, by the main processor, a first control signal for registering a key value corresponding to a first key from among keys included in the external remote controller as a selected function from among a plurality of functions capable of being performed by the electronic apparatus to the communication module, based on product information of the electronic apparatus stored in the main memory; registering, by the communication module, the key value corresponding to the first key to the selected function based on the first control signal; and controlling the main processor, based on a signal corresponding to the key value corresponding to the first key being received from the external remote controller, to perform the selected function.

The selected function may be a turn-on function, and the controlling may include, in a state in which the main processor is powered off and the communication module is powered on, based on the signal corresponding to the key value corresponding to the first key being received from the external remote controller, controlling the main processor to be powered on.

The transmitting may include transmitting, by the main processor, the first control signal for registering the key value corresponding to the first key to the turn-on function and a first application execution function to the communication module.

The controlling may include, based on the signal corresponding to the key value corresponding to the first key being received from the external remote controller while the main processor is powered off, transmitting a second control signal for controlling the main processor to be powered on and executing a first application corresponding to the first application execution function to the main processor; and the method may include, based on the second control signal being received from the communication module while the main processor is powered off, being switched from a power off state to a power on state and executing the first application to display the first application execution screen.

The controlling may include based on the electronic apparatus being powered on for a first time or a software stored in the main memory of the electronic apparatus being updated, transmitting the first control signal for registering the key value corresponding to the first key from among the keys included in the external remote controller as the selected function to the communication module.

The method may further include, based on the electronic apparatus being powered on, confirming, by the main processor, a flag stored in the main memory, and the transmitting may include, based on a first value being recorded in the flag, transmitting the first control signal for registering the key value corresponding to the first key from among the keys included in the external remote controller to the communication module based on the product information of the electronic apparatus.

The method may further include: recording, by the main processor, a second value in the flag after transmitting the first control signal for registering the key value corresponding to the first key as the selected function; based on power being on, confirming the flag by the main processor; and based on the second value being recorded, not transmitting the first control signal to the communication module by the main processor.

The method may further include downloading information on the key value of the external remote controller corresponding to the selected function from an external server based on the product information of the electronic apparatus.

The method may further include: providing a user interface (UI) to set keys of the external remote controller to be mapped to the turn-on function; and based on the second key from among the keys included in the external remote controller being set to be mapped to the turn-on function through the UI, transmitting, by the main processor, the first control signal for registering a key value corresponding to the second key as the turn-on function to the communication module.

BRIEF DESCRIPTION OF THE DRAWINGS

The above and other aspects, features, and advantages of certain embodiments of the disclosure will be more apparent from the following description taken in conjunction with the accompanying drawings in which:

FIG. 3A is a schematic illustration of a table stored in a communication module of an electronic apparatus according to an embodiment;

FIGS. 5A and 5B are views illustrating a Vendor Specific Command (VSC) for modifying a table stored in a communication module according to an embodiment.

FIG. 6 is a schematic illustration of an electronic apparatus according to an embodiment that performs a specific application when turned on;

DETAILED DESCRIPTION

Figure 1A:
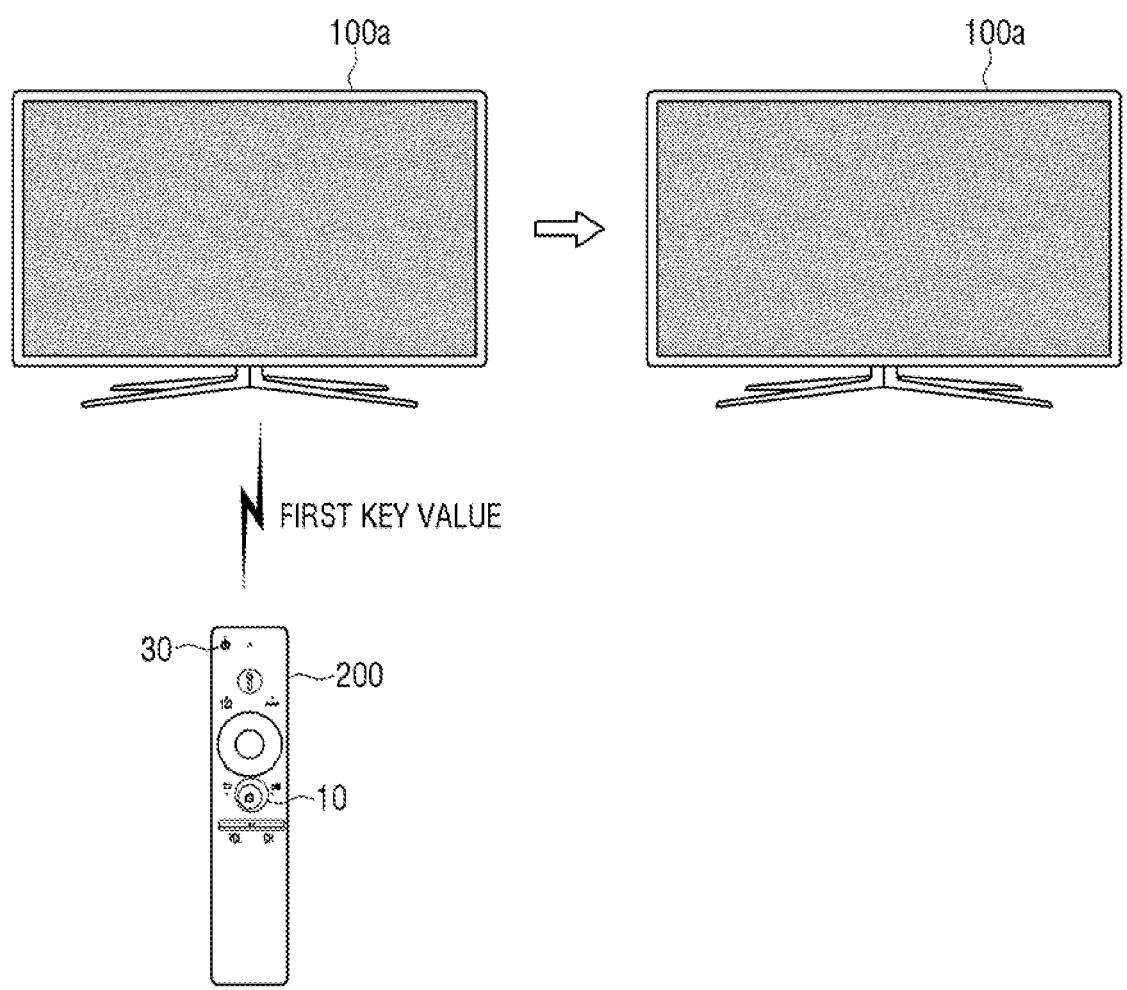
FIGS. 1A and 1B are schematic illustration of a turn-on method of an electronic apparatus according to an embodiment.

Hereinafter, various embodiments are provided. However, it should be understood that the present disclosure is not limited to the specific embodiments described hereinafter, but includes various modifications, equivalents, and/or alternatives of the embodiments of the present disclosure.

In the present application, the terms "include," "may include," "comprise" and "may comprise" designate the presence of features (e.g. numbers, steps, operations, components, elements, or a combination thereof) that are written in the specification, but do not exclude the presence or possibility of addition of one or more other features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

In the description, the terms "first, second, and so forth" are used to describe diverse elements regardless of their order and/or importance and to discriminate one element from other elements, but are not limited to the corresponding elements. For example, a first user appliance and a second user appliance may indicate different user appliances regardless of their order or importance. For example, without departing from the scope as described herein, a first element may be referred to as a second element, or similarly, a second element may be referred to as a first element.

In the exemplary embodiment of the present disclosure, the term "module," "unit," or "part" is referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), the other element (e.g., a third element) may not be existed between the element and another element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, a "processor configured (or set) to perform A, B, and C" may refer to a dedicated processor (e.g., an embedded processor) to perform a corresponding operation, or a generic-purpose processor (e.g., CPU or application processor) that can perform the corresponding operation by execution one or more software programs stored in a memory device.

The terms used in the description are used to merely describe a specific embodiment, but may not intend to limit the scope of other embodiments. Unless otherwise defined specifically, a singular expression may encompass a plural expression. All terms (including technical and scientific terms) used in the description could be used as meanings commonly understood by those ordinary skilled in the art to which the present disclosure belongs. The terms that are used in the present disclosure and are defined in a general dictionary may be used as meanings that are identical or similar to the meanings of the terms from the context of the related art, and they are not interpreted ideally or excessively unless they have been clearly and specially defined. According to circumstances, even the terms defined in the embodiments of the present disclosure should not be interpreted as excluding the embodiments of the present disclosure.

Electronic apparatuses according to various embodiments of the disclosure may include, for example, a television, a signage, a digital video disk (DVD) player, a set-top box, a home automation control panel, a security control panel, a TV box (e.g., Samsung HomeSync™, Apple TV™, or Google TV™) game console (e.g., Xbox™, PlayStation™), an electronic picture frame, a smartphone, a table personal computer (PC), a mobile phone, a video telephone, an e-book reader, a desktop personal computer (PC), a laptop personal computer (PC), a netbook computer, a workstation, a server, a personal digital assistant (PDA), a portable multimedia player (PMP), a wearable device, a flexible device, or the like. Further, the electronic device according to the embodiments of the present disclosure is not limited to the above-described devices, but may include new electronic devices in accordance with the technical development.

Certain exemplary embodiments will now be described in greater detail with reference to the accompanying drawings. In describing exemplary embodiments, detailed description of relevant known functions or components may be omitted if it would obscure the description of the subject matter. In relation to explanation of the drawings, similar drawing reference numerals may be used for similar constituent elements.

Figure 1B:
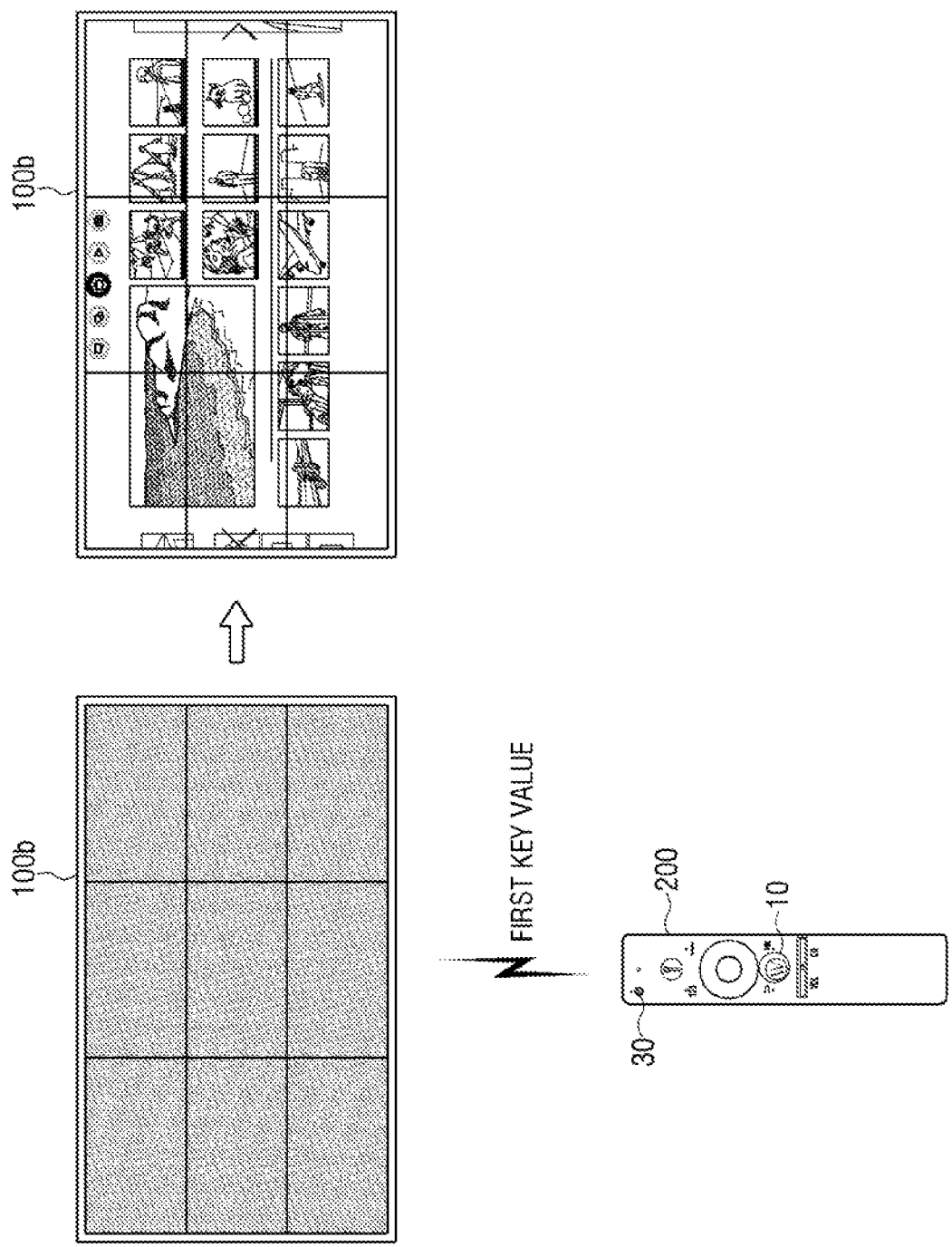

FIGS. 1A and 1B are schematic illustrations of a method of turning on an electronic apparatus using a remote controller according to an embodiment.

Referring to FIGS. 1A and 1B, electronic apparatuses 100a and 100b may be controlled by a remote controller 200.

A remote controller 200 of FIG. 1A and a remote controller 200 of FIG. 1B are the same remote controller. The same remote controller in the disclosure may refer to a case in which signals transmitted according to selection of the same key are the same, and outward appearance may be different. For example, a shape printed on a button (key) may be different. Particularly, a house shape is printed on a first key 10 of a remote controller 200 as illustrated in FIG. 1A, and a 'W' shape is printed on a first key 10 of the remote controller 200 as illustrated in FIG. 1B. The only different thing is a printed shape, and the same signal (a signal corresponding to the first key value) is transmitted when the first key 10 of the remote controller 200 described in FIG. 1A is selected and when the first key 10 of the remote controller 200 described in FIG. 1B.

That is, as illustrated in FIG. 1A, while the electronic apparatus 100A is turned off, the electronic apparatus 100a is not turned on when receiving a signal corresponding to the first key value corresponding to the first key 10 of the remote controller 200. On the other hand, referring to FIG. 1B, while the electronic apparatus 100a is turned off, the electronic apparatus 100b is turned on when receiving the signal corresponding to the first key value corresponding to the first key 10 of the remote controller 200.

As such, there is a method for differentiating a firmware of a communication module that receives and processes a signal of the remote controller 200 from the electronic apparatuses 100a and 100b in order to turn on an electronic apparatus 100b and not to turn on another electronic apparatus 100A by the same remote controller signal.

That is, the method operates differently for the firmware of the communication module for the electronic apparatus 100a of FIG. 1A and the firmware of the communication module for the electronic apparatus 100b of FIG. 1B.

However, changing the firmware of the communication module whenever the product specification changes may require more effort in managing firmware, and may cause confusion by mixing modules in the process of developing/producing the electronic apparatuses 100a and 100b.

In the disclosure, when a product specification is determined, the electronic apparatuses using the same communication module may change software of the electronic apparatus so that even the same remote controlling signal can support different turn-ons.

Hereinafter, the electronic apparatus according to the embodiments will be more fully described.

Figure 2A:
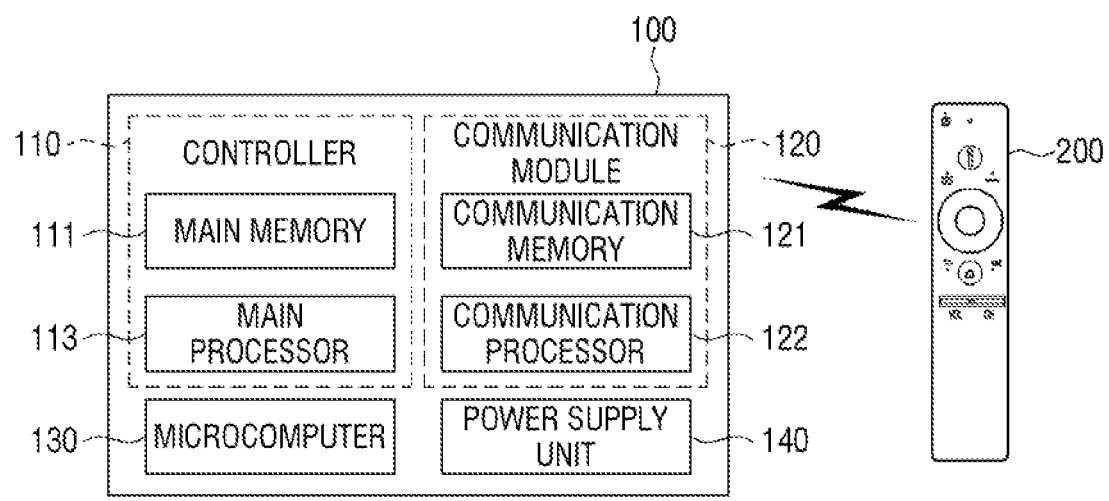
FIGS. 2A and 2B are schematic illustration of a configuration of an electronic apparatus according to an embodiment.

FIG. 2A is a schematic illustration of a configuration of the electronic apparatus 100 according to an embodiment.

The electronic apparatus 100 receives a signal corresponding to a key selected by the remote controller 200 and performs an operation corresponding thereto. According to an embodiment, the electronic apparatus 100 may be a device capable of processing an image such as a television (TV) or a set-top box.

The electronic apparatus 100 may include a controller 110, a communication module 120, a microcomputer 130, and a power supply unit 140.

The controller 110 is a configuration for multiple unit control of the electronic apparatus 100. The controller 110 may include a main memory 111 and a main processor 113. The main memory 111 and the main processor 113 may be implemented as a single chip.

The main memory 111 may include at least one of a dynamic RAM (DRAM), a static RAM (SRAM) or a synchronous dynamic RAM (SDRAM), a non-volatile memory (e.g., one-time programmable ROM (OTPROM)), a programmable ROM (PROM), an erasable and programmable ROM (EPROM), an electrically erasable and programmable ROM (EEPROM), a mask ROM, a flash ROM, a flash memory (e.g. NAND flash or NOR flash, etc.), a hard drive, or solid state drive (SSD), or the like.

The main memory 111 may store various data, programs or applications for driving and controlling the electronic apparatus 100. A program stored in the main memory 111 may include one or more computer executable instructions. The main memory 111 may include a software and/or a firmware. The module may correspond to a set of instructions. The program (one or more instructions) or the application stored in the main memory 111 may be executed by the main processor 113.

The main processor 113 is configured to control an overall operation of the electronic apparatus 100. For example, the main processor 113 may drive an operating system and an application to generate control signals for controlling a plurality of hardware or software components connected to the main processor 113, and may perform various data processing and calculations. The main processor 113 may be a central processing unit (CPU) or a graphics-processing unit (GPU).

The communication module 120 is a component for performing wireless communication with an external device, and may perform wireless communication with the remote controller 200. The communication module 120 may be implemented as a communication memory 121 and a communication processor 122. The communication module 120 may be implemented as a single chip.

The communication memory 121 may, for example, include at least one of non-volatile memory (e.g. one-time programmable ROM (OTPROM), a programmable ROM (PROM), an erasable and programmable ROM (EPROM), an electrically erasable and programmable ROM (EEPROM), or the like.

The communication memory 121 may store a table defining a relation between a key value corresponding to a signal received from the remote controller 200 and a function of the electronic apparatus 100. For example, a table as shown in FIG. 3A may be stored in the communication memory 121.

Figure 3B:
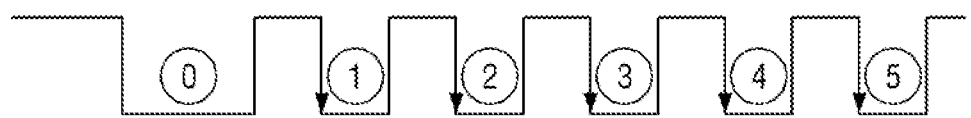
FIG. 3b is a schematic illustration of an example of a signal transmitted by a communication module of an electronic apparatus to a controller according to an embodiment.

The communication processor 122 may generate a control signal for executing a function of the electronic apparatus 100 corresponding to a wireless signal received from outside based on the table stored in the communication memory 121, and may transmit the generated signal to the microcomputer 130. For example, a signal corresponding to a turn-on function may be transmitted to the microcomputer 130 in the form of a pulse as shown in FIG. 3B.

The communication processor 122 may be implemented as a micro-processor unit (MPU), a micro control unit (MCU), or the like.

The microcomputer 130 may control the power supply unit 140 in order to control the supply of power to each component. For example, when a control signal corresponding to a turn-on function is received from the communication module 120, the microcomputer 130 may control the power supply unit 140 to supply power to the controller 110 so that the main processor 113 may be powered on.

The microcomputer 130 may include an interrupt port capable of receiving a signal corresponding to turn-on/off functions.

The power supply unit 140 may supply power to each component of the electronic apparatus 100 under control of the microcomputer 130 so that each component may be driven.

Figure 2B:
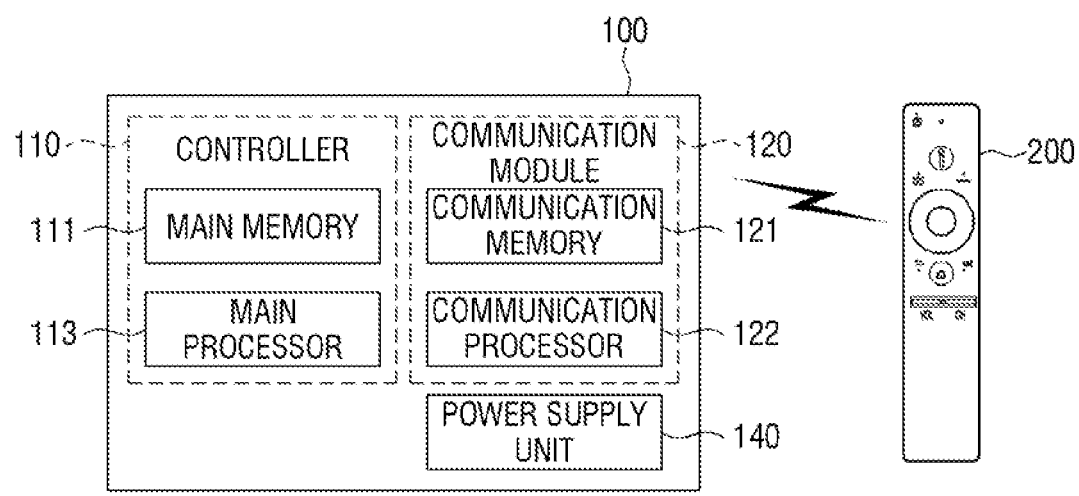

According to another embodiment, the microcomputer 130 may be implemented by the communication processor 122 and may be omitted. The embodiment of the electronic apparatus in which the microcomputer 130 is omitted is illustrated in FIG. 2B. In this case, the communication processor 122 may control the power supply unit 140 to control supply of power to the controller 110.

The power supply unit 140 may supply standby power to some of the components of the electronic apparatus 100. The standby power refers to power (or electrical energy) supplied to some of the components of the electronic apparatus 100 when a plug of the device is plugged into an outlet regardless of an operation state of the electronic apparatus 100.

The electronic apparatus 100 may be operated as a turn-off state (may be referred to as a first mode or low power mode (LPM)) or a turn-on state (may be referred to as a second mode or a normal mode). The turn-off state of the electronic apparatus 100 is a state in which a plug of the electronic apparatus 100 is plugged in an outlet and power is not supplied to the controller 110, but power is supplied to the communication module 120. In addition, the turn-on state of the electronic apparatus 100 is a state in which power is supplied not only to the communication module 120 but also to the controller 110. A state when power is supplied to a component may be referred to as "powered on", and a state when power is not supplied to a component may be referred to as "powered off".

The power supply unit 140 may supply power to the communication module 120 at all times. Accordingly, even if the electronic apparatus 100 is turned off, that is, even if the main processor 113 is powered off, the communication module 120 remains powered on so that the communication module 120 may receive a signal received from the remote controller 200, and if the received signal is a signal for turning on the electronic apparatus 100, the communication module 120 may control the main processor 113 to be powered on. For example, when the communication processor 122 transmits a control signal corresponding to a turn-on function to the microcomputer 130, the microcomputer 130 may supply power to the controller 110 by controlling the power supply unit 140 so that the main processor 113 may be powered on. According to another embodiment, when the microcomputer 130 is not provided in the electronic apparatus 100 as shown in FIG. 2B, the communication processor 122 may directly control the power supply unit 140 so that the main processor 113 is powered on.

As the communication module 120 should always be powered on, a low power communication method may be utilized, but embodiments are not limited thereto. For example, the communication module 120 may support a wireless communication method such as Bluetooth (Bluetooth classic, Bluetooth Low Energy (BLE), etc.), ANT+, Z-wave, Zigbee, or Wi-Fi Direct (WFD).

Figure 4:
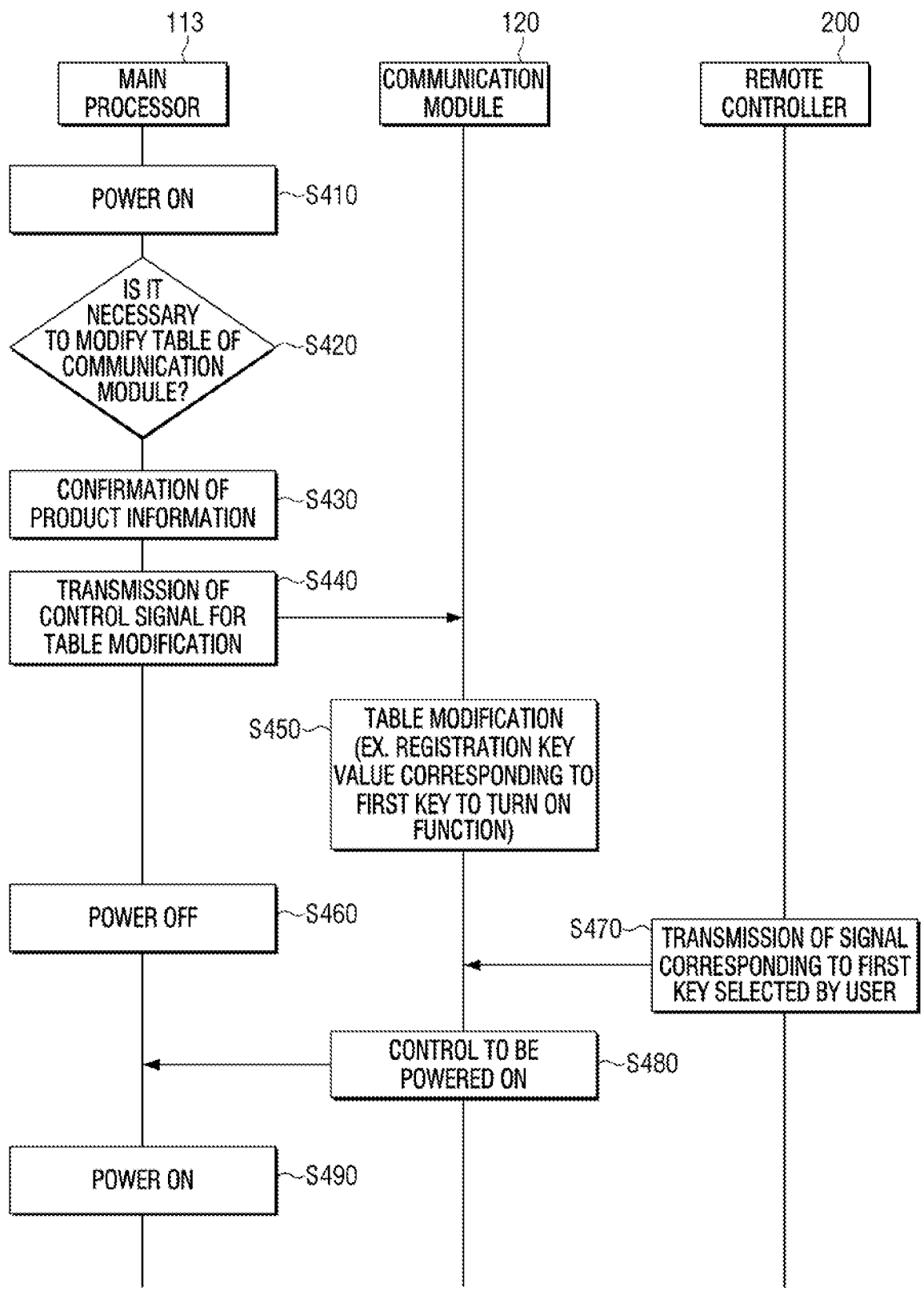
FIG. 4 is a flow diagram illustrating a method of modifying a table stored in a communication module according to an embodiment.

FIG. 4 is a flow diagram illustrating a method of modifying a table stored in a communication module according to an embodiment.

Referring to FIG. 4, in the state in which the main processor 113 is powered on (S410), the main processor 113 may determine whether a modification of a table that defines a relation between a key value corresponding to a signal received from the remote controller 200 and the function of the electronic apparatus 100 (hereinafter, referred to as a table) is necessary (S420).

The main processor 113 may determine that the modification of the table stored in the communication memory 121 is necessary when the electronic apparatus 100 is turned on for the first time, the remote controller 200 is first paired with the electronic apparatus 100, or a software stored in the main memory 111 is identified as updated.

According to another embodiment, the main processor 113 may confirm a flag stored in the main memory 111 when the main processor 113 is powered on, may determine that modification to the table stored in the communication memory 121 is necessary when a first value is recorded in the flag, and may determine that modification to the table stored in the communication memory 121 is unnecessary when a second value is stored in the flag. The main processor 113 may change the flag value from the first value to the second value after the table is modified.

If it is determined that modification to the table stored in the communication memory 121 is necessary, the main processor 113 may confirm product information of the electronic apparatus 100 stored in the main memory 111 (S430), and transmit a control signal for modifying the table to the communication module 120 based on the product information (S440). According to an embodiment, the product information may include information indicating how to modify the table of the main memory 111. According to another embodiment, the product information may include only information for identifying the electronic apparatus 100 such as a product key, product ID, software version information, etc., and the main processor 113 may download information indicating how to modify the table of the main memory 111 from an external server based on the product information of the electronic apparatus 100. For example, the main processor 113 may download information indicating to register a key value of a specific key of the remote controller 200 with a turn-on function from an external server.

The control signal for modifying the table is a function selected among a plurality of functions that the electronic apparatus can perform the key value corresponding to the specific key of the remote controller 200, and may be a signal for newly registering or releasing a previously registered function. In addition, the main processor 113 may transmit the control signal for confirming a key value registered as a specific function in the table stored in the communication memory 121.

According to an embodiment, the main processor 113 may modify the table stored in the communication memory 121 by a vendor specific command (VSC).

The VSC as shown in FIG. 5A may be defined for registration/release/confirming as described above (the function of turning on in the state of turning off corresponds to background turn on). In addition, it is possible to define the VSC capable of enabling/disabling so that a specific function can immediately change an operation in the case of key values already registered (refer to as FIG. 5B). For example, when the turn-on function is registered on the first key value, the main processor 113 may modify the table stored in the communication memory 121 with the VSC that disables the function of the first key value.

The main processor 113 may record the second value on the flag described above after transmitting the control signal for modifying the table. The main processor 113 may not perform a table modification again after confirming the second value recorded on the flag. A flag value may be recorded as the first value again if a situation in which the table modification is required such as software of the main memory 111 is updated, etc.

The communication processor 122 that has received the control signal for the table modification may modify the table stored in the communication memory 121 (S450). For example, if the control signal is a control signal for registering the key value corresponding to the first key to the turn-on function, the communication processor 122 may modify the table stored in the communication memory 121 in order that the key value corresponding to the first key and the turn-on function are mapped.

Next, while the electronic apparatus 100 is turned off by a user's operation so that the main processor 113 is powered off (S460), if the user selects a first key of the remote controller 200, the remote controller 200 may transmit a signal corresponding to the first key (S470).

Based on the modified table, the communication module 120 which has received the signal from the remote controller 200 may identify the received signal corresponds to the turn-on function and control to power on the main processor 113 (S480). According to an embodiment, the communication module 120 may transmit the control signal for powering on the main processor 113 to the microcomputer 130, and the microcomputer 130 may control the power supply unit 140 so that power is supplied to the control unit 110. According to another embodiment, the communication module 120 may directly control the power supply unit 140 to supply power to the controller 110. Accordingly, the main processor 113, which is supplied with power, may be powered on (S490).

According to another embodiment, not only the turn-on function but also a function for executing a specific application may be registered in a single key value. Accordingly, if a key corresponding to such key value is selected from the remote controller 200, the electronic apparatus 100 is turned on and the specific application may also be executed. In addition, FIG. 6 is a schematic illustration of an embodiment.

Figure 6:
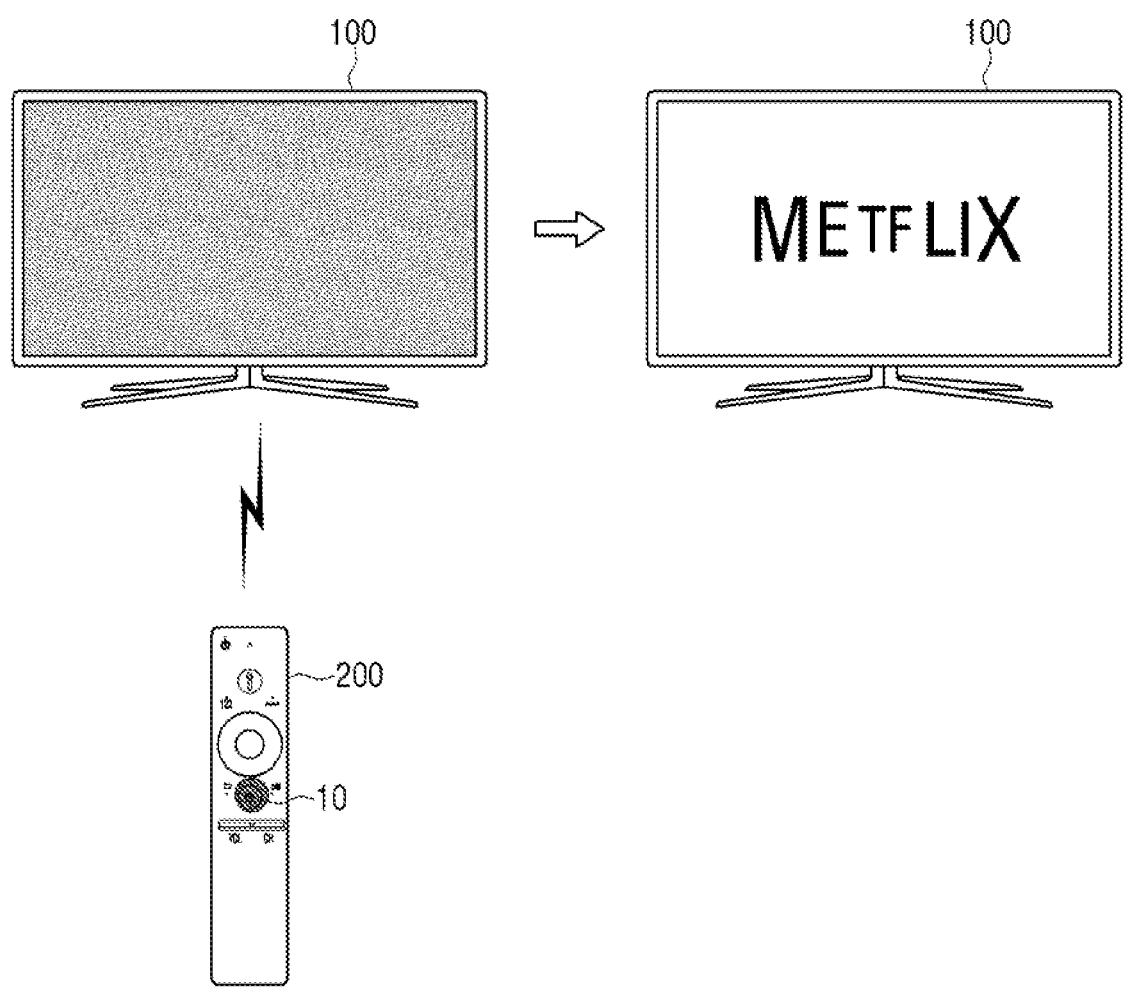

Referring to FIG. 6, when a first key 10 of the remote controller 200 is selected while the electronic apparatus 100 is turned off, the electronic apparatus 100 is turned on and the application "METFLIX" providing video on demand (VOD) content may be executed.

For example, the main processor 113 may obtain information indicating how to modify the table stored in the communication memory 121 based on the product information of the electronic apparatus 100. This information may include information on which key value should be registered/unregistered the turn-on function, which key value should be registered/unregistered the execution function of a specific application, or the like. Such information may be included in the product information, or may be downloaded by the main processor 113 from an external server based on the product information.

Based on the information obtained from the product information, the main processor 113 may transmit, for example, the control signal for registering the turn-on function and the first application execution function to the key value corresponding to the first key of the remote controller 200 to the communication module 120.

The communication module 120 may register the turn-on function and the first application execution function to the key value corresponding to the first key based on the control signal transmitted by the main processor 113.

Then, when the main processor 113 is powered off and receives a signal corresponding to the key value corresponding to the first key from the remote controller 200, the communication module 120 may transmit the control signal for controlling the main processor 113 to be powered on and executing the first application to the main processor 113.

Accordingly, the main processor 113 may execute the first application upon being powered on. When the electronic apparatus 100 is a device including a display, the execution screen of the first application may be displayed on the display, and when the electronic apparatus 100 does not include the display and is connected to an external display device, a control signal for displaying the execution screen of the first application may be output to the external display device.

However, it is only an embodiment, the turn-on function and the first application execution function may be registered to separate key values. For example, the turn-on function may be registered to a third key, and the first application execution function may be registered to a fourth key, respectively. At this time, when the main processor 113 receives a signal corresponding to a key value corresponding to the third key from the remote controller in the power-off state, the main processor 113 may transmit a third control signal for turning on power to the main processor 113. In addition, when a signal corresponding to a key value corresponding to the fourth key is received, the main processor 113 may transmit a fourth control signal for executing the first application to the main processor 113.

According to another embodiment, it is available to register a specific function to a key of the remote controller 200 according to user interaction. The electronic apparatus 100 according to the disclosure may provide a user interface (UI) for user interaction.

For example, the electronic apparatus 100 may further include a display. And the main processer 113 may control the display to display the UI for allowing a user to set a key of the remote controller 200 to be mapped to the turn-on function, and when a second key among keys included in the remote controller 200 is set to be mapped to the turn-on function through the UI, the main processor 113 may transmit a control signal for registering the key value corresponding to the second key as a turn-on function to the communication module 120.

In addition, according to an embodiment, the electronic apparatus 100 may be turned on by a specific key of the remote controller 200, and at the same time, may provide the UI for allowing a user to designate an application to be execute. The main processor 113 may transmit a control signal for modifying a table of the communication module 120 according to the user setting through the UI, and the communication module 120 may modify the table to map the turn-on function and an execution function of the specific application to the specific value according to a received control signal. Accordingly, when a signal corresponding to the corresponding key is received from the remote controller 200 while the electronic apparatus 100 is turned-off, the communication module 120 may transmit the control signal for executing the specific application and controlling the main processor 113 to be powered on to the main processor 113.

Figure 7:
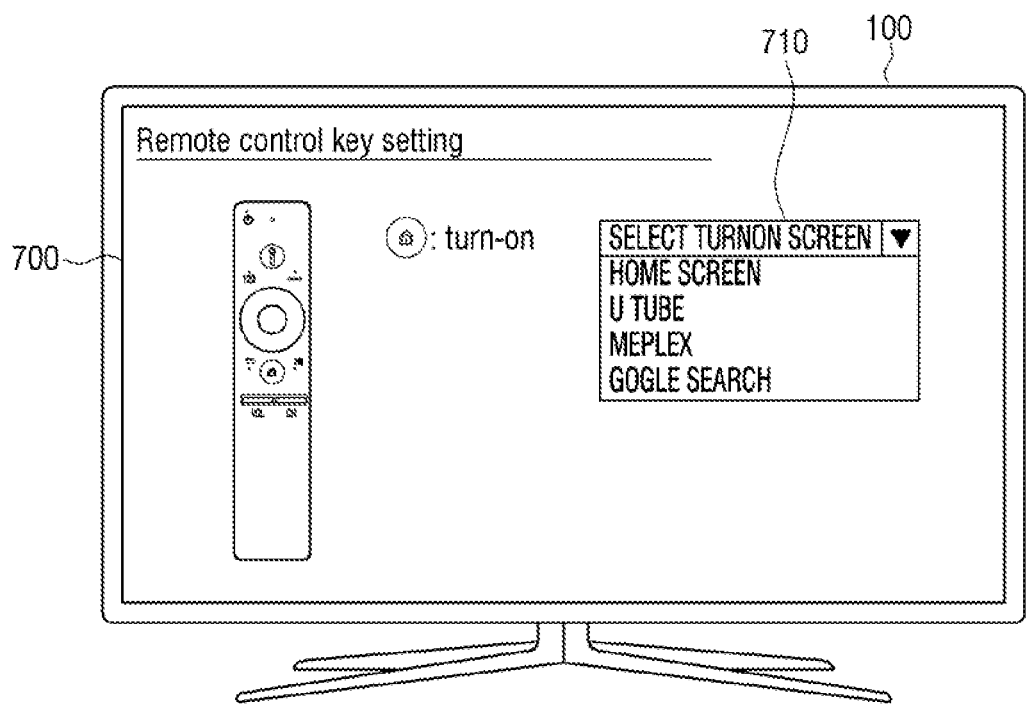
FIG. 7 is a schematic illustration of a User Interface (UI) provided by an electronic apparatus according to an embodiment.

FIG. 7 is a schematic illustration of a user interface (UI) provided by the electronic apparatus 100 according to an embodiment.

Referring to FIG. 7, the electronic apparatus 100 may display a UI 700 for receiving a user input mapping a turn-on function and an execution function of a specific application to a specific key of the remote controller 200. When a first key (a home key) is selected, the UI (700) may include a UI element 710 capable of selecting a screen to be initially displayed when the electronic apparatus is turned on. The UI element 710 may be in the form of a drop down menu as illustrated in FIG. 11, but embodiments are not limited thereto. The screen capable of displaying for the first time while the electronic apparatus 100 is turned on may include a preset home screen or an execution screen of a third party application installed in the electronic apparatus 100. A user may map any one of these to the key of the remote controller through the UI element 710. If the user selects "MEPLEX", when the first key (10) is selected as illustrated in FIG. 6, the MEPLEXE may be immediately executed while the electronic apparatus is turned on. According to an embodiment, users may map a desired function to a key of the remote controller, regardless of the existing setting of the remote controller 200.

Figure 8:
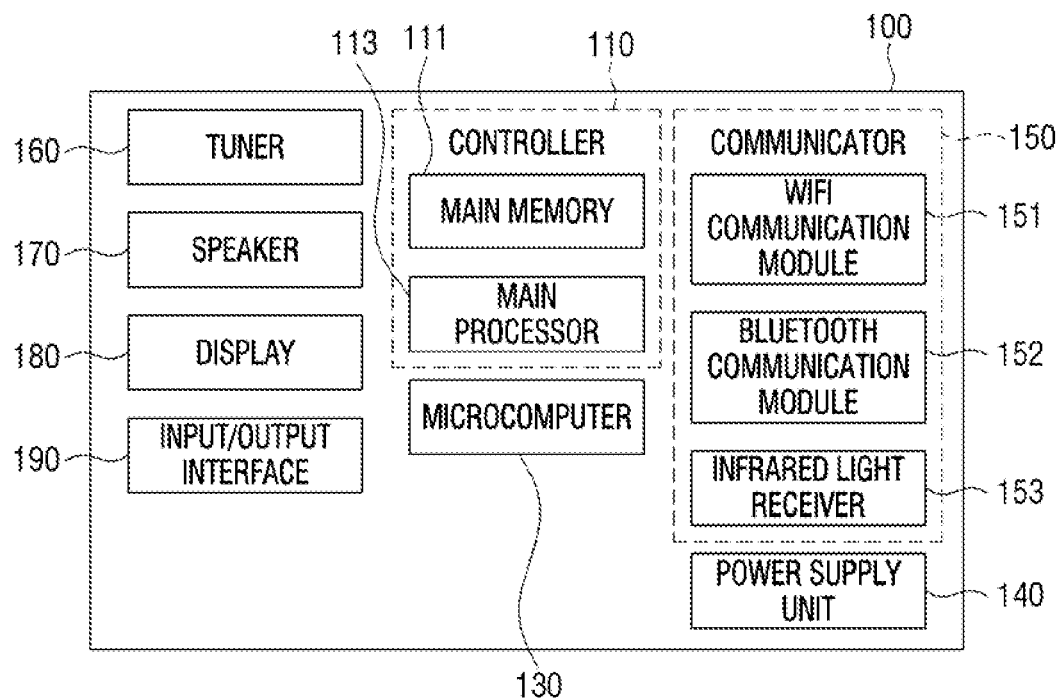
FIG. 8 is a schematic illustration of a configuration of an electronic apparatus according to another embodiment.

FIG. 8 is a schematic illustration of a configuration of the electronic apparatus 100 according to another embodiment.

Referring to FIG. 8, the electronic apparatus 100 may include a controller 110, a communicator, 150, a microcomputer 130, a power supply unit 140, a tuner 160, a speaker 170, a display 180, and an input/output interface 190. Some of the components may be omitted according to the embodiment, and appropriate hardware/software components which are apparent for those skilled in the art may be further included in the electronic apparatus 100, even though not shown.

The electronic apparatus 100 may be implemented as a TV, for example, a digital TV, a 3D-TV, a smart TV, an LED TV, an OLED TV, a plasma TV, a monitor, a curved TV having a screen having a fixed curvature (curvature), a flexible TV with fixed curvature screens, a bended TV with fixed curvature screens, and/or a curvature-variable TV that can change a curvature of a current screen by a received user input, but embodiments are not limited thereto.

The electronic apparatus 100 may be implemented as a set-top box, in which case, the speaker 180 and the display 180 may not be included.

The main processor 113 is configured to control an overall operation of the electronic apparatus 100. The main processor 113 may drive an operating system and an application to control a plurality of hardware or software components connected to the main processor 113 and to perform various data processing and calculations. The main processor 113 of FIG. 8 may perform an operation of the main processor 113 of FIG. 2A.

The main memory 111 may store various data, programs or application for driving and controlling the electronic apparatus 100. The programs stored in the main memory 111 may include one or more instructions. The programs (one or more instructions) or application stored in the main memory 111 may be executed by the main processor 113. The main memory 111 of FIG. 8 may be the same as the main memory 111 of FIG. 2A.

The communicator 150 is configured to perform communication with an external device. The communicator 150 may include a Wi-Fi communication module 151 supporting a Wi-Fi communication method, a Bluetooth communication module 152 supporting a Bluetooth communication method, and an infrared light receiving unit 153 capable of receiving an infrared signal. In addition, the communication unit 150 may include a local area network (LAN), a wide area network (WAN), a value added network (VAN), a mobile radio communication network, a satellite communication network, and one or more components that enable communication through a mutual combination thereof.

The Bluetooth communication module 152 may perform the function of the communication module 12 described above. In this case, the main processor 113 may transmit a control signal for modifying a table stored in the Bluetooth communication module 152 to the Bluetooth communication module 152, and the Bluetooth communication module 152 may control the main processor 113 to be powered on by communicating with the remote controller 200 in a Bluetooth communication method.

The communicator 150 may not communicate with an external server. For example, the electronic apparatus 100 may download information on a function to be registered to a specific key value of the remote controller 200 from the external server. Based on the downloaded information, the main processor 113 may transmit the control signal for modifying the table stored in the Bluetooth communication module 152 to the Bluetooth communication module 152.

The microcomputer 130 may control supply of power to each component by controlling the power supply unit 140.

The Bluetooth communication module 152 and the infrared light receiver 153 may be powered by the power supply unit 140 even when the electronic apparatus 100 is turned off. The electronic apparatus 100 may be turned on by a signal received from the infrared light receiver 153 or the Bluetooth communication module 152 even in the turn-off state. That is, the main processor 113 may be powered on.

The tuner 160 may tune only a frequency of a channel that the electronic apparatus 100 intends to receive, among many radio wave components by amplifying, mixing, resonating, etc. broadcast signals received in a wired or wireless manner to select the broadcast signal. The broadcast signal may include video, audio, and additional data (e.g., an electronic program guide (EPG)).

The tuner 160 may receive broadcast signals from various sources such as terrestrial broadcasting, cable broadcasting, satellite broadcasting, or the like.

The tuner 160 may be implemented in the electronic apparatus 100 or as a separate device (e.g., a set-top box, a tuner connected to the input/output interface 190) having a tuner unit electrically connected to the electronic apparatus 100.

The speaker 170 is a component for outputting sound. The electronic apparatus 100 may include a headphone output terminal.

The display 180 is a component for outputting an image. The display 180 may be implemented as a liquid crystal display (LCD), a light-emitting diode (LED) display, an organic light-emitting diode (OLED), an active-matrix organic light-emitting diode), a passive-matrix OLED (PMOLED), alternately the display 180 may be implemented as a touch screen.

When the main processor 113 is switched from a turn-off state to a turn-on state, the main processor 113 may control the display 180 to display a preset image. The preset image may be a preset home screen, or an execution screen of a preset application.

The input/output interface 190 is a component to be connected to an external device. The input/output interface 190 may include at least one of a High-Definition Multimedia Interface port (HDMI), a component input jack, and a universal serial bus (USB) port, an RGB port, a digital visual interface (DVI) port, a DisplayPort (DP), a Thunderbolt, or the like.

When the electronic apparatus 100 is implemented as the set-top box, the main processor 113 may be connected to an external display device through the input/output interface 190. For example, the electronic apparatus 100 and the external display device may be connected through the HDMI cable. In this case, when the main processor 113 is switched from a turn-off state to a turn-on state, the main processor 113 may transmit an image signal corresponding to the preset image to the external display device through the HDMI cable. The preset image may be the preset home screen or the execution screen of the preset application.

Figure 9:
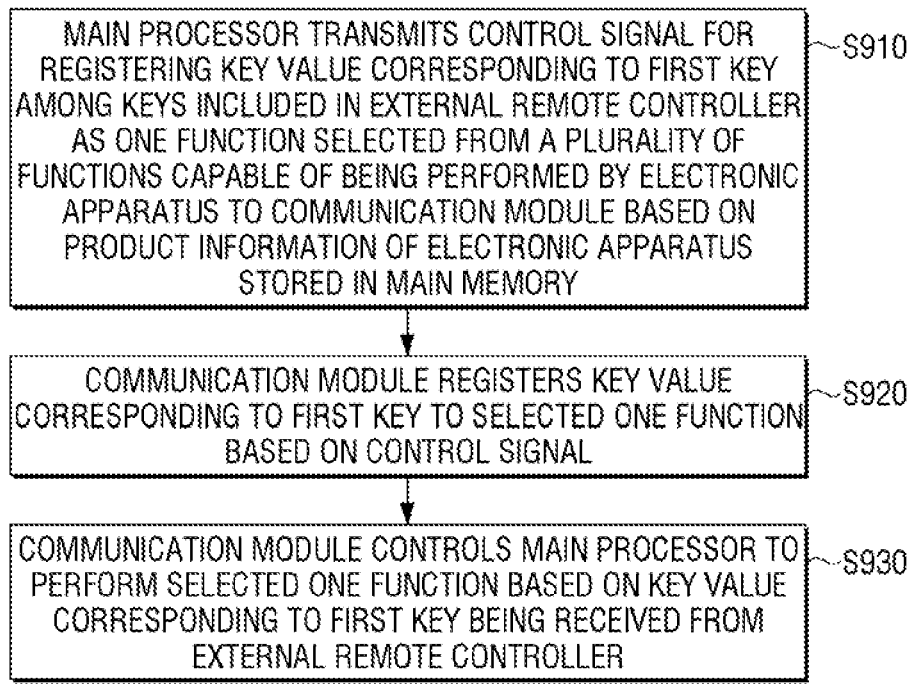
FIG. 9 is a flow chart of a controlling method of an electronic apparatus according to an embodiment.

FIG. 9 is a flow chart illustrating an embodiment of a controlling method of the electronic apparatus including a communication module for wireless communication between an external remote controller and the electronic apparatus, a main memory storing at least one instruction, and a main processor executing at least one of the instructions. The flow chart illustrated in FIG. 9 may be composed of operations processed in the electronic apparatus 100 described herein. Accordingly, even if contents are omitted below, a technical content related to the electronic apparatus 100 may be applied to the flow chart illustrated in FIG. 9.

Referring to FIG. 9, based on the product information of the electronic apparatus stored in the main memory, the main processor may transmit the control signal for registering the key value corresponding to the first key among the keys included in the external remote controller as one function selected from a plurality of functions that can be performed by the electronic apparatus to the communication module (S910).

According to an embodiment, in S910, when the electronic apparatus is powered on for the first time or when the software stored in the main memory of the electronic apparatus is updated, based on the product information of the electronic apparatus stored in the main memory, the main processor may transmit the control signal for registering the key value corresponding to the first key among the keys included in the external remote controller as the selected function to the communication module.

When the main processor is powered on, it may confirm a flag stored in the main memory. In this case, in S910, when the first value is recorded in the flag, based on the product information of the electronic apparatus, the main processor may transmit the control signal for registering the key value corresponding to the first key among the keys included in the external remote controller as the selected function to the communication module. In this case, the main processor may transmit the control signal for registering the key value corresponding to the first key as the turn-on function to the communication module, and then may record a second value in the flag. When the main processor is powered on, the main processor may confirm the flag stored in the main memory and may not transmit the control signal to the communication module if the second value is recorded.

In addition, the communication module may register a key value corresponding to a first key to one selected function based on a control signal received from the main processor (S920).

In addition, the communication module may control the main processor to perform the selected one function when the key value corresponding to the first key is received from an external remote controller (S930).

In this case, the selected one function may be a turn-on function and may control the main processor so that the main processor is powered on, when the communication module in S930 receives a signal corresponding to the key value corresponding to the first key when the main processor is powered off and the communication module is powered on.

According to an embodiment, in S910, the main processor may transmit the control signal, which registers the key value corresponding to the first key to the turn-on function and to the first application execution function, to the communication module based on the product information.

In this case, in S930, when the main processor is powered off and receives the signal corresponding to the key value corresponding to the first key from the external remote controlling, the communication module may transmit the control signal, which controls the main processor to be powered on and executes the first application, to the main processor. And the main processor may provide the execution screen of the first application according to the control signal which executes the first application received when power is on.

The main processor may provide a user interface (UI) for allowing users to set a key of an external remote controller to map to the turn-on function, and when a second key of the keys included in the external remote controller is set to be mapped to the turn-on function through the UI, the main processor may transmit a control signal, which registers a key value corresponding to the second key to the turn-on function, to the communication module. Such UI may allow users to map the turn-on function to a desired key on the remote controller and to map the turn-on function on two or more keys. In addition, as described with reference to FIG. 11, users may map a specific application execution function to a specific key of the remote controller.

According to embodiments described above, if the specification of the electronic apparatus is changed and needs to be turned on by another key of the remote controller, this can be solved by software change. Therefore, it is not necessary to newly produce the remote controller itself of the communication module itself which will be included in the electronic apparatus, thereby obtaining an improved effect on cost and management sides.

Various embodiments described above may be implemented in software, hardware, or a combination thereof. According to the hardware embodiment, exemplary embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. Particularly, various embodiments described above may be implanted by the main processor 113 of the electronic apparatus 100. In a software configuration, various embodiments described in the specification such as a procedure and a function may be embodied as separate software modules. The software modules may respectively perform one or more functions and operations described in the present specification.

Various embodiments may be implemented in software including instructions that may be stored in a machine-readable storage media that can be read as by machine (e.g., a computer). The machine is a device capable of calling a stored instruction from a storage media and operating according to the called instruction, and may include the electronic apparatuses of the disclosed embodiments.

When the instruction is executed by a processor, the processor may directly perform a function corresponding to the instruction by using other components directly or under the control of the processor. Instructions may include code generated or executed by a compiler or an interpreter. For example, instructions stored in a storage media are executed by the processor so that the controlling method of the electronic apparatus may be executed. For example, based on product information of the electronic apparatus stored in a memory of the electronic apparatus, a controlling method of the electronic apparatus including transmitting a control signal for registering a key value corresponding to a first key among the keys included in an external remote controller to the turn-on function to the communication module of the electronic apparatus may be performed. The machine readable storage media may be provided in the form of a non-transitory storage media. 'Non-transitory' means that the storage media does not include a signal and is tangible, and does not distinguish that data is stored permanently or temporarily on the storage media.

According to an embodiment, a method according to various embodiments of the discloser may be included a computer program product and be provided. The computer program product may be traded between sellers and buyers as a product. The computer program product is a form of storage media that can be read by a device (e.g. compact disc read only memory (CD-ROM), or may be distributed online through an application store (e.g. Play Store™, App Store™). In the case of an online distribution, at least a portion of the computer program product may be at least temporarily stored in the storage media such as a server of a manufacturer, a server of an application store, or a relay server, or may be temporarily generated.

Each component (e.g., modules or programs) according to various embodiments may be composed of a singular or plural number of objects, and some of the above-described subcomponents may be omitted, or other subcomponents may be further included in various embodiments. Alternately or additionally, some components (e.g., modules or programs) may be integrated into one entity to perform the same or similar functions performed by each corresponding component prior to integration. Operations performed by a module, a program module, or other component, according to various exemplary embodiments, may be sequential, parallel, or both, executed iteratively or heuristically, or at least some operations may be performed in a different order, omitted, or other operations may be added.

The foregoing embodiments and advantages are merely examples and are not to be construed as limiting the present disclosure. The present teaching may be readily applied to other types of apparatuses. Also, the description of the embodiments of the present disclosure is intended to be illustrative, and not to limit the scope of the claims, and many alternatives, modifications, and variations will be apparent to those skilled in the art.

What is claimed is:

1. An electronic apparatus comprising:
   a communication module configured to wirelessly communicate with an external remote controller;
   a main memory configured to store at least one instruction; and
   a main processor configured to execute the at least one instruction,
   wherein the main processor is further configured to transmit a first control signal for mapping a key value corresponding to a first key from among keys included in the external remote controller with a function from among a plurality of functions capable of being performed by the electronic apparatus to the communication module, based on product information of the electronic apparatus stored in the main memory, and
   wherein the communication module is further configured to map the key value corresponding to the first key with the function based on the first control signal, and control the main processor to perform the function based on a signal corresponding to the key value corresponding to the first key being received from the external remote controller.

2. The electronic apparatus as claimed in claim 1, wherein the function is a turn-on function for turning on the electronic apparatus, and
   wherein the communication module is further configured to, in a state in which the main processor is powered off and the communication module is powered on, based on the signal corresponding to the key value corresponding to the first key being received from the external remote controller, control the main processor to be powered on.

3. The electronic apparatus as claimed in claim 2, wherein the main processor is further configured to, based on the product information, transmit the first control signal for mapping the key value corresponding to the first key with the turn-on function and a first application execution function to the communication module.

4. The electronic apparatus as claimed in claim 3, further comprising a display,
   wherein the communication module is further configured to, based on the signal corresponding to the key value corresponding to the first key being received from the external remote controller while the main processor is powered off, transmit a second control signal for controlling the main processor to be powered on and execute a first application corresponding to the first application execution function to the main processor, and
   wherein the main processor is further configured to, based on the second control signal being received from the communication module while the main processor is powered off, be switched from a power off state to a power on state and execute the first application to display an execution screen of the first application.

5. The electronic apparatus as claimed in claim 2, further comprising a display,
   wherein the main processor is further configured to:
   control the display to display a user interface (UI) to set a key of the external remote controller to be mapped to the turn-on function, and
   based on a second key from among the keys included in the external remote controller being set to be mapped to the turn-on function through the UI, transmit the first control signal for mapping a key value corresponding to the second key with the turn-on function to the communication module.

6. The electronic apparatus as claimed in claim 1, wherein the main processor is further configured to, based on the electronic apparatus being powered on for a first time or a software stored in the main memory of the electronic apparatus being updated, transmit the first control signal to the communication module.

7. The electronic apparatus as claimed in claim 1, wherein the main processor is further configured to:
   based on the main processor being powered on, confirm a flag stored in the main memory,
   based on a first value being recorded in the flag, perform an operation for transmitting the first control signal for mapping the key value corresponding to the first key from among the keys included in the external remote controller with the function, and
   based on a second value being recorded in the flag, not perform the operation.

8. The electronic apparatus as claimed in claim 7, wherein the main processor is further configured to transmit the first control signal for mapping the key value corresponding to the first key with the function to the communication module and register the second value to the flag.

9. The electronic apparatus as claimed in claim 1, wherein the main processor is further configured to, based on the product information of the electronic apparatus, download information on the key value of the external remote controller corresponding to the function from an external server.

10. The electronic apparatus as claimed in claim 1, wherein the communication module comprises a communication processor and a communication memory,
    wherein the main processor is further configured to, based on the product information of the electronic apparatus, transmit the first control signal for mapping the key value corresponding to the first key from among the keys included in the external remote controller with the function from among the plurality of functions capable of being performed by the electronic apparatus to the communication module,
wherein the communication memory is configured to store a table which defines a relation between the key value corresponding to the signal received from the external remote controller and the function of the electronic apparatus, and
wherein the communication processor is configured to, based on the first control signal received from the main processor, modify the table stored in the communication memory.

11. The electronic apparatus as claimed in claim 1, wherein the communication module is configured to communicate with the external remote controller using Bluetooth communication.

12. A method of controlling an electronic apparatus comprising a communication module configured to wirelessly communicate with an external remote controller, a main memory configured to store at least one instruction, and a main processor configured to execute the at least one instruction, the method comprising:
transmitting, by the main processor, a first control signal for mapping a key value corresponding to a first key from among keys included in the external remote controller with a function from among a plurality of functions capable of being performed by the electronic apparatus to the communication module, based on product information of the electronic apparatus stored in the main memory;
mapping, by the communication module, the key value corresponding to the first key with the function based on the first control signal; and
controlling the main processor, based on a signal corresponding to the key value corresponding to the first key being received from the external remote controller, to perform the function.

13. The method as claimed in claim 12, wherein the function is a turn-on function, and
wherein the controlling comprises, in a state in which the main processor is powered off and the communication module is powered on, based on the signal corresponding to the key value corresponding to the first key being received from the external remote controller, controlling the main processor to be powered on.

14. The method as claimed in claim 13, wherein the transmitting comprises transmitting, by the main processor, the first control signal for mapping the key value corresponding to the first key with the turn-on function and a first application execution function to the communication module.

15. The method as claimed in claim 14, wherein the controlling comprises, based on the signal corresponding to the key value corresponding to the first key being received from the external remote controller while the main processor is powered off, transmitting a second control signal for controlling the main processor to be powered on and executing a first application corresponding to the first application execution function to the main processor; and
the method further comprises, based on the second control signal being received from the communication module while the main processor is powered off, being switched from a power off state to a power on state and executing the first application to display an execution screen of the first application.

16. The method as claimed in claim 13, further comprising:
providing a user interface (UI) to set a key of the external remote controller to be mapped to the turn-on function; and
based on a second key from among the keys included in the external remote controller being set to be mapped to the turn-on function through the UI, transmitting, by the main processor, the first control signal for mapping a key value corresponding to the second key with the turn-on function to the communication module.

17. The method as claimed in claim 12, wherein the controlling comprises based on the electronic apparatus being powered on for a first time or a software stored in the main memory of the electronic apparatus being updated, transmitting the first control signal for mapping the key value corresponding to the first key from among the keys included in the external remote controller with the function to the communication module.

18. The method as claimed in claim 12, further comprising:
based on the electronic apparatus being powered on, confirming, by the main processor, a flag stored in the main memory,
wherein the transmitting comprises, based on a first value being recorded in the flag, transmitting the first control signal for mapping the key value corresponding to the first key from among the keys included in the external remote controller to the communication module based on the product information of the electronic apparatus.

19. The method as claimed in claim 18, further comprising:
recording, by the main processor, a second value in the flag after transmitting the first control signal for mapping the key value corresponding to the first key with the function;
based on power being on, confirming the flag by the main processor; and
based on the second value being recorded, not transmitting the first control signal to the communication module by the main processor.

20. The method as claimed in claim 12, further comprising:
downloading information on the key value of the external remote controller corresponding to the function from an external server based on the product information of the electronic apparatus.

* * * * *